Sept. 20, 1932.  C. B. COOK  1,877,816
LIQUID BATH APPARATUS
Filed June 17, 1929  3 Sheets-Sheet 1
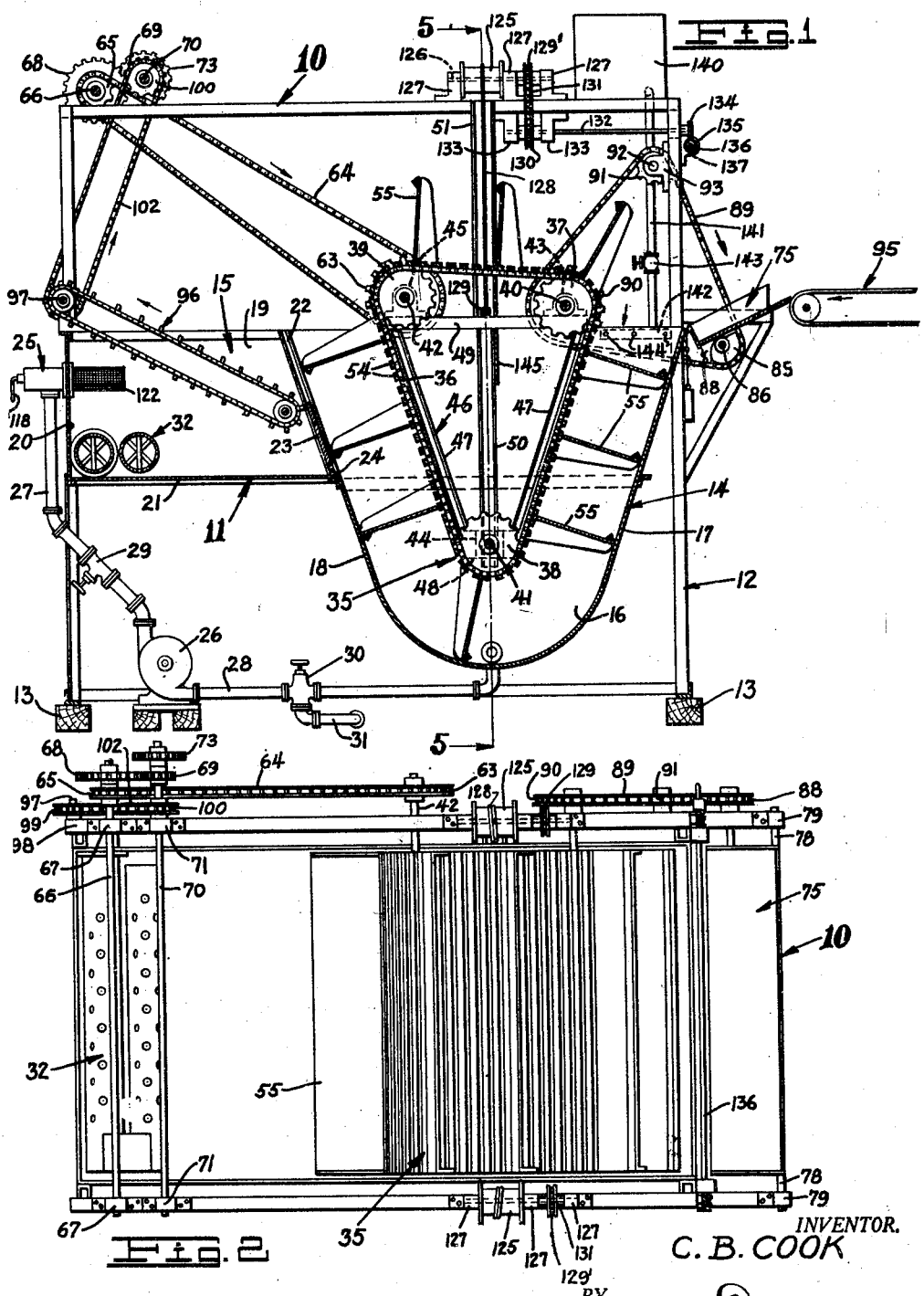
INVENTOR.
C. B. COOK
BY
ATTORNEY.

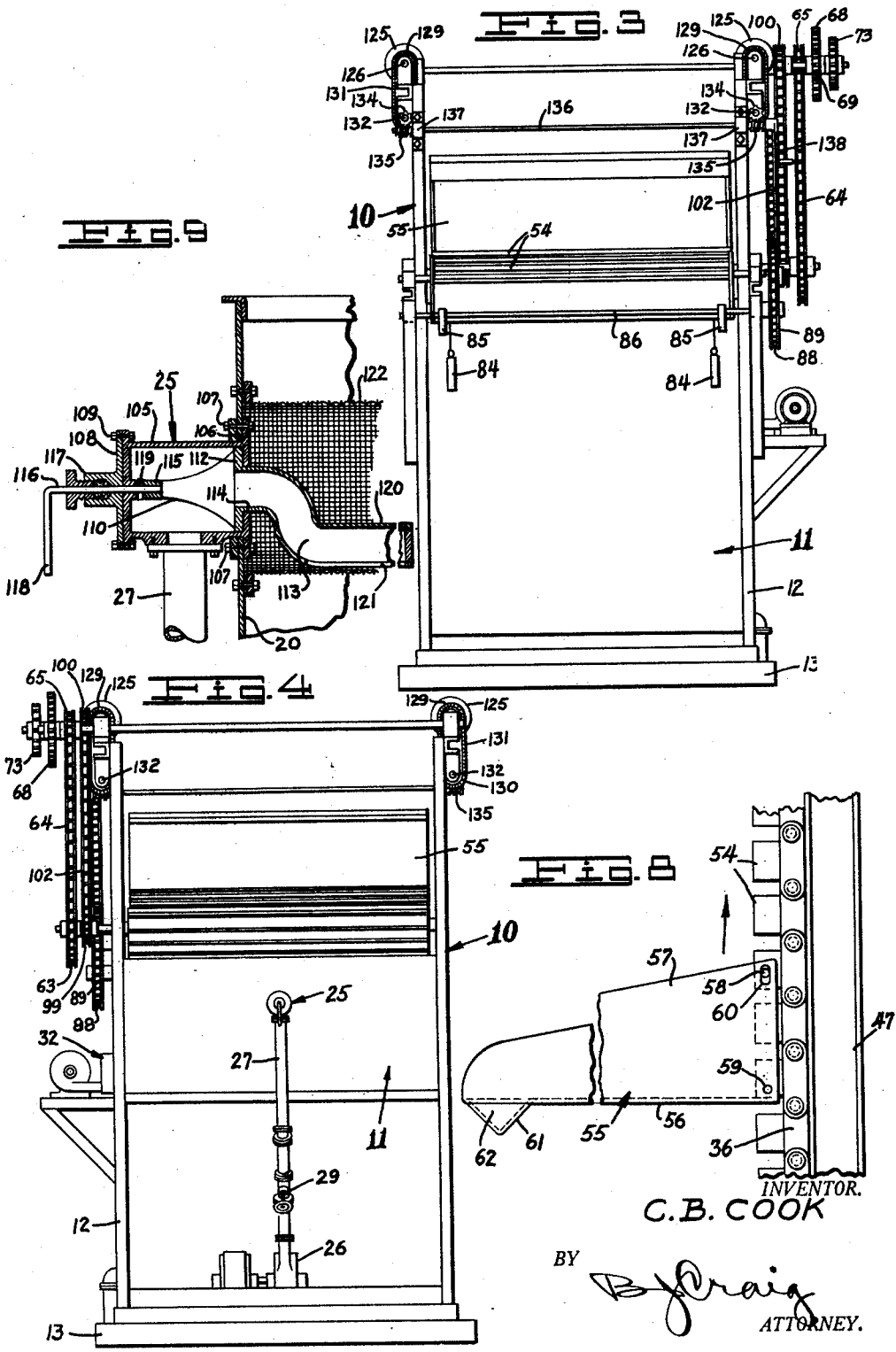

Sept. 20, 1932.   C. B. COOK   1,877,816
LIQUID BATH APPARATUS
Filed June 17, 1929    3 Sheets-Sheet 3

INVENTOR.
C. B. COOK
BY
B. J. Craig
ATTORNEY.

Patented Sept. 20, 1932

1,877,816

UNITED STATES PATENT OFFICE

CHARLES B. COOK, OF LOS ANGELES, CALIFORNIA

LIQUID BATH APPARATUS

Application filed June 17, 1929. Serial No. 371,442.

This invention relates to liquid bath apparatus.

The general object of the invention is to provide an improved means for treating fruit and other objects with fluid compositions.

A more specific object of the invention is to provide a novel method of preparing fruit for market wherein liquid such as water or borax solution is forced into the pores of the fruit and wherein the liquid is preferably maintained at a predetermined temperature.

Another object of the invention is to provide a novel means for treating fruit with a solution wherein a short bath is provided which is of sufficient depth to cause the liquid to exert considerable fluid pressure on the fruit as it passes therethrough.

Another object of my invention is to provide a novel means for delivering fruit to a fruit bathing machine.

A further object of my invention is to provide a novel means for maintaining circulation in a fruit bath apparatus.

An additional object of my invention is to provide a novel arrangement of conveyor parts for a bath apparatus.

A further object of my invention is to provide a novel support and drive for the conveyor of a bath apparatus whereby the conveyor can be raised or lowered without disengaging the driving chains.

Other objects and the advantages of this invention will be apparent from the following description taken in connection with the accompanying drawings wherein:

Fig. 1 is a central longitudinal section through my improved liquid bath apparatus.

Fig. 2 is a top plan view of my device with some of the parts removed.

Fig. 3 is a view of the loading end of the device.

Fig. 4 is a view of the discharge end of the device.

Fig. 8 is an enlarged fragmentary side view of the conveyor mechanism showing one of the flutes in detail and Fig. 9 is an enlarged fragmentary section through the strainer outflow pipe.

Figure 5:
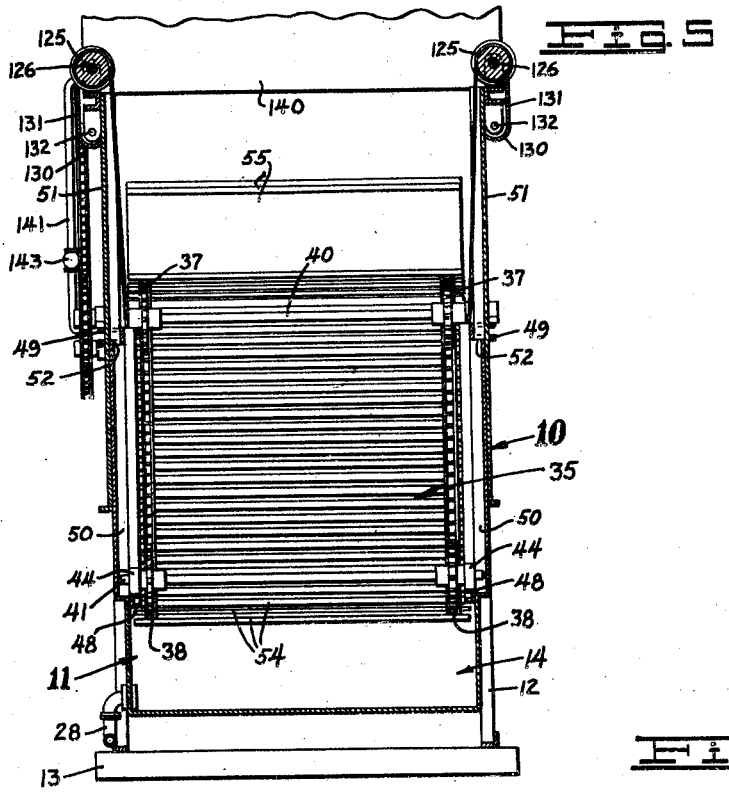
Fig. 5 is a section taken on line 5—5 of Fig. 1.

Referring to the drawings by reference characters I have indicated my improved liquid bath apparatus generally at 10. As shown the device 10 includes a tank indicated generally at 11, supported on a frame 12 which is mounted on a plurality of spaced sills 13. The tank 11 includes a portion 14 and a portion 15 with the bottom wall of the portion 15 disposed above the bottom wall of the portion 14. The portion 14 includes side walls 16 and end walls 17 and 18, which are arranged at an angle to the perpendicular and are rounded adjacent the bottom to form the bottom wall.

The portion 15 includes side walls 19, an end wall 20 and a bottom wall 21. Secured to the side walls of the portion 15 I provide guideways 22 in which a removable partition 23 is adapted to be positioned. The guideways 22 are arranged at an angle to correspond to the angle of the end wall 18 of the tank portion 14 and a stop member 24 is provided on the guideways 22 to maintain the lower edge of the removable portion spaced from the bottom wall 21 of the tank portion 15.

The tank 11 is adapted to be filled to within a few inches of the top with a liquid solution which is continuously maintained in circulation from the tank portion 15 to the tank portion 14 by means of a circulating system which includes an outlet device 25 and a pump 26 which may be driven by any suitable motive power. The outlet device 25 is connected to the pump 26 by a pipe 27 and the pump is connected to the tank portion 14 by a pipe 28. The outlet device 25 will be more fully described hereinafter.

Interposed in the pipe 27 between the outlet device and the pump I provide a shut-off valve 29 and interposed in the pipe 28 between the pump and the tank portion 14 I provide a control valve 30 which is adapted when in one position to direct fluid from the pump to the tank portion 14 and in another position to direct the fluid to a drain pipe 31.

For maintaining the fluid in the tank 11 at a predetermined temperature I provide in the tank portion 15 a heater indicated generally at 32. Any suitable type of heater may be employed but I have shown and preferably use a heater such as shown in my co-pending application Serial No. 120,066, filed July 2, 1926.

Mounted within the tank portion 14 I arrange a fruit conveyor indicated generally at 35. As shown this conveyor comprises a pair of spaced endless chains 36 mounted on three sprockets 37, 38, and 39 which are in turn secured to shafts 40, 41, and 42 mounted in bearings 43, 44, and 45 secured to a frame indicated generally at 46. This frame 46 includes two pair of spaced side members 47 each of which are connected at the bottom by a member 48 to which the bearings 44 are secured and at the top by a member 49 to which the bearings 43 and 45 are secured. The members 47 and the sprocket chain 36 are arranged at an angle corresponding to the angle of the end walls of the tank portion 14 and the bearing 45 is arranged to support the shaft 42 above the shaft 40 for a purpose which will be more fully described hereinafter.

Secured to the side walls of the tank portion 14 I provide a channel member 50 in which the ends of the shaft 41 are adapted to be positioned.

Positioned over each of the channel members 50 I provide a channel member 51, each of which extends above the top of the tank and is secured to the upper portion of the frame 12. The top members 49 of the frame 46 are each provided with an aperture 52 in which the channel members 51 are positioned. Thus the frame 46 is held in position at the top by the channel members 51 and at the bottom by the ends of the shaft 41 being positioned in the channel members 50 and the weight of the frame and its associated parts is supported by the top edges of the sides of the tank 11. The channel members 51 are a sliding fit in the aperture 52 so that the frame 46 and its associated parts may be bodily raised out of the tank portion 14 to allow cleaning thereof and adjustments or repairs to the conveyor.

Secured to the sprocket chains 36 I provide a plurality of transversely extending spaced slats 54 to which are secured a plurality of cleats indicated generally at 55 and shown in detail in Fig. 8. These cleats 55 each include a bottom wall 56 and tapered side walls 57 which are wider adjacent the chains 36 and diminish towards the outer end of the cleat. Each of the cleats 55 is secured to the slats 54 by pins 58 and 59 in such a manner that the bottom walls 56 of the cleats maintain a position at right angles to the adjacent end walls 17 and 18 of the tank portion 17. To allow the cleats to travel around the arcs adjacent the sprockets the fastening pins 58 of each cleat are positioned in elongated apertures 60 in the side walls of the cleats.

To strengthen the free ends of the cleats I preferably bend the bottom wall 56 thereof back upon itself in triangular formation as indicated at 61 (Fig. 8) and close the ends of the triangular portion by means of plates 62 thereby preventing water from entering the triangular portion and being carried beyond the top of the tank.

For driving the conveyor I secure on the shaft 42 a sprocket wheel 63 which is driven by a chain 64 from a sprocket 65 secured to a shaft 66 positioned in bearings 67 on the frame 12.

For driving the shaft 66 I secure thereto a gear 68 which meshes with a gear 69 secured to a shaft 70 which is mounted in bearing 71 on the frame 12. The shaft 70 is adapted to be driven by a sprocket or gear 73 secured thereto which in turn may be driven in any desired manner from a suitable source of power.

Figure 6:
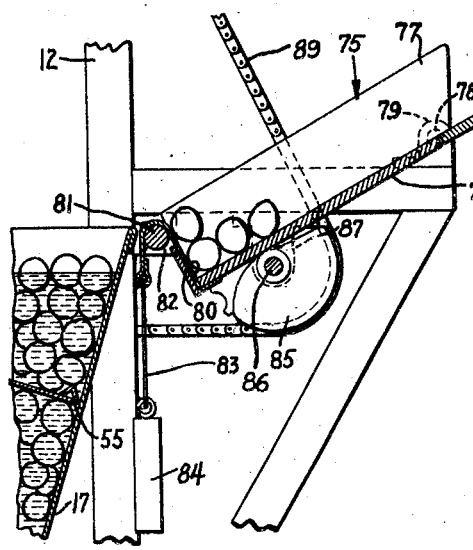
Fig. 6 is an enlarged view of the loading mechanism in a position to restrict the fruit from entering the device.
Figure 7:
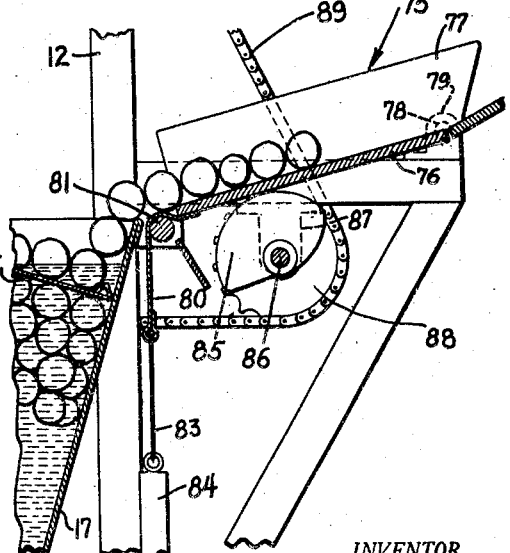
Fig. 7 is a view similar to Fig. 6 showing the loading mechanism in a position to deliver fruit to the device.

The fruit to be treated in the device 10 is preferably intermittently delivered to the conveyor mechanism and to accomplish this I provide a loading mechanism indicated generally at 75 and shown in detail in Figs. 6 and 7.

As shown the loading mechanism 75 comprises a platform 76 having side walls 77 thereon to which, adjacent the receiving end, are secured pivots 78 which are mounted in bearings 79 secured to a portion of the main frame 12. A section of fabric 80, such as canvas, is secured to the free end of the platform and is positioned over a roller 81 which is supported in bearings 82 on the frame 12. Secured to the free end of the fabric 80 as by cords 83 I provide a plurality of weights 84 which are of sufficient weight to maintain the fabric taut at all times. The weights 84 are not heavy enough to raise the platform 76. The platform 76 is supported adjacent the free end upon a pair of spaced cams 85 which are secured to a shaft 86 mounted in bearings 87 on the frame 12. The periphery of the cams 85 are such that in one position the free end of the platform 76 is below the roller 81 and the top edge of the tank wall 17, in which position the fabric 80 forms an end wall wherein the fruit delivered to the loading mechanism is collected on the platform between the side walls 77 thereof and the fabric as clearly shown in Fig. 6.

When the cams 85 are in another position the free end of the platform 76 is raised to a point slightly above the roller 81 and the top edge of the tank wall 17, in which position the fruit collected on the platform will roll into the tank portion 14 as clearly shown in Fig. 7.

For actuating the cams 85 in unison with the conveyor mechanism I secure to the shaft 86 a sprocket 88 which is adapted to be driven by a chain 89. The chain 89 engages a sprocket 90 secured to the shaft 40 of the conveyor mechanism and an idler sprocket 91 secured to a shaft 92 mounted in a bearing 93 secured to the main frame 12.

Thus when the conveyor mechanism is operating the loading mechanism actuates therewith. The loading platform and the conveyor sprocket are so positioned in relation to each other that the fruit is discharged from the platform 76 into the tank at a point where full advantage is taken of the additional space between cleats occasioned by the cleats passing through the arc formed by the sprocket 37. Thus allowing a greater quantity of fruit to be discharged into the tank on a maximum speed of the conveyor than would be possible if the fruit was delivered into the tank at a point wherein the cleats are at right angles to the end wall 17.

By positioning the shaft 42 higher than the shaft 40 as previously stated the cleats 55 adjacent the end wall 18 of the tank portion 14 are retained in a position at right angles to the wall 18 until they pass above the top edge of the tank thereby providing the maximum amount of time for discharging the fruit from the cleats. The fruit may be delivered to the loading platform by an endless conveyor system as indicated at 95 or in any other desired manner.

For removing the fruit from the tank portion 15 I provide therein an endless conveyor mechanism of any desired type indicated generally at 96. This conveyor mechanism includes a drive shaft 97 mounted in bearings 98 on the frame 12 and has secured thereto a sprocket 99 which is adapted to be driven from a sprocket 100 secured to the shaft 70 through the medium of a chain 102. The conveyor mechanism 96 may discharge the fruit onto another endless conveyor or into a chute or any other device desired.

The outlet device 25 in the tank portion 15 is of novel construction and comprises a casing 105 positioned in an aperture 106 in the tank end wall 20 and secured to the end wall as by bolts 107 and includes an end member 108 secured thereto as by bolts 109. Positioned within the casing 105 I provide a member 110 which includes an enlarged flange 112 secured as by welding to a pipe portion 113 which extends through an aperture 114 in the end of the casing 105. The member 110 further includes a boss 115 in which is secured one end of a shaft 116 which extends through a packing gland 117 in the end member 108, and is bent at an angle to form a handle portion 118. Interposed between the boss 115 and the end member 108 I provide a heavy spring washer 119 which is adapted to retain the flange 112 in engagement with the end wall of the casing 105.

The pipe 113 is bent to form an offset portion 120 which is closed at the end and provided on one side with an elongated aperture 121. Positioned over and spaced from the pipe 113 and coaxial with the casing 105 I provide a screen 122 which is preferably made of wire mesh. The screen 122 is of such diameter that the offset portion 120 of the pipe 113, will, when rotated by the shaft 116, travel in a path adjacent the side walls thereof. Thus by reversing the pump 26 and rotating the shaft 116 to turn the pipe 113 the water pressure emitting from the elongated aperture 121 will clean the accumulated refuse from the screen 122.

For raising the conveyor mechanism 35 I provide a pair of drums 125 which are secured to shafts 126 mounted in bearings 127 on the frame 12. Cables 128 are secured as at 129 to the top members 49 of the frames 46 and are adapted to be wound upon the drums 125. For operating the drums 125 I secure to each of the shafts 126 a sprocket 129' which are adapted to be driven from sprockets 130 through the medium of chains 131. The sprockets 130 are secured to shafts 132 which are mounted in bearings 133 and extend beyond the end of the frame 12 where they are provided with worm gears 134.

The worm gears 134 mesh with worm pinions 135 secured to a transverse shaft 136 which is mounted in bearings 137 on the frame 12 and is provided adjacent one end with a hand crank 138.

By positioning the idler sprockets 91 and the sprockets 65 above the normal position of the sprockets 45 and 43, the conveyor mechanism may be raised without removing the chains 64 and 89 from their respective sprockets.

For treating the fruit with a vegetable or mineral oil to control blue mold I provide a tank 140 on the frame 12 which is connected by a pipe 141 to a header 142 positioned adjacent the top of the tank. The pipe 141 is provided with a control valve 143 and the header 142 is provided with a plurality of jets 144 which communicate with the interior of the tank portion 14. A light gravity fluid for instance a mineral such as distillate or a vegetable oil such as olive oil, or other suitable oil, is placed in the tank 140 and by the proper adjustment of the valve 143 the desired amount of treating fluid may be admitted to the tank.

To retain the greater portion of the treating fluid in the section of the tank portion adjacent the loading mechanism I provide a baffle plate 145 which is secured to the sides of the tank and extends downward a short distance. As the treating fluid is a light gravity substance it will at all times tend to rise to the surface of the water in the tank even though it may be carried downward by the cleats 55.

As the fruit is delivered into the tank portion 14 it first passes through the layer of oil before it reaches the water or solution. As the fruit is submerged the surplus oil thereon is washed off and rises to the surface. The use of oil may, of course, be omitted if desired.

Having thus described my invention, I claim:

1. In a device for treating fruit with fluid, a tank, an elevator arranged in said tank, said elevator including an endless member having cleats therein, said cleats including a body having sides thereon, said cleats being arranged to move with the sides down at one end of the tank and with the sides up at the other end of the tank, said cleats acting with the walls of said tank to provide pockets and means to deliver fruit to said pockets, said cleats having their bodies inclined downwardly towards their free ends when in each end of the tank.

2. In a device for treating fruit with fluid, a tank comprising a U-shaped compartment, an elevator arranged in said compartment, said elevator having cleats thereon in conjunction with the walls of said compartment to provide pockets, said compartment having an opening thereto, a loading device adjacent to said compartment, said loading device being movable and means for operating said loading device at predetermined intervals.

3. In a device of the class described, a tank, said tank including an end wall, a conveyor in said tank, means to operate said conveyor, cleats on said conveyor, a loading platform, said platform being pivoted at the end removed from said tank with the end thereof adjacent said tank being free, side members on said platform, a roller interposed between said tank wall and the free end of said platform, a fabric secured to the free end of said platform, said fabric being positioned over said roller and extending downward, means associated with said fabric to maintain it taut, means to deposit articles on said platform, means to move said platform about its pivot and means to operate said moving means.

4. In a device of the class described, a tank, said tank including an end wall, a conveyor in said tank, means to operate said conveyor, cleats on said conveyor, a loading platform, said platform being pivoted at the end removed from said tank with the end thereof adjacent said tank being free, side members on said platform, means to deposit articles on said platform, means to move said platform about its pivot and means to operate said moving means, said moving means being adapted to allow said platform to swing the free end down and said moving means being adapted to swing said platform upward to a raised position where articles contained on said platform will be free to move into said tank, said conveyor and said platform moving means being synchronized to discharge articles from said platform into said tank at predetermined positions of said conveyor cleats.

5. In a device of the class described, a tank, said tank including an end wall, a conveyor in said tank, means to operate said conveyor, cleats on said conveyor, a loading platform, said platform being pivoted at the end removed from said tank with the end thereof adjacent said tank being free, side members on said platform, a roller interposed between said tank wall and the free end of said platform, a fabric secured to the free end of said platform, said fabric being positioned over said roller and extending downward, means associated with said fabric to maintain it taut, means to deposit articles on said platform, means to move said platform about its pivot and means to operate said moving means, said moving means being adapted to allow said platform to swing to a position wherein the free end of said platform is below said roller and said fabric forms an end wall whereby articles deposited on said platform will be retained thereon, and said moving means being adapted to swing said platform upward to a raised position wherein said fabric ceases to form an end wall and articles contained on said platform will be free to move into said tank, said conveyor and said platform moving means being synchronized to discharge articles from said platform into said tank at predetermined positions of said conveyor cleats.

6. In a device of the class described, a tank including end walls arranged at an angle, a conveyor mounted in said tank, said conveyor including a sprocket mounted at each end of said tank adjacent the top of said tank and a sprocket mounted adjacent the lower end of said tank, said sprockets being arranged in triangular form on an endless chain supported in triangular form on said three sprockets, said sprockets being so arranged that said chain is positioned at an angle corresponding to the angle of the adjacent end wall of the deep tank section, a plurality of cleats on said chain, said cleats being so arranged to remain, at all times, at right angles to the adjacent end wall of said tank.

7. In a device of the class described, a tank including end walls arranged at an angle, a conveyor in said tank, said conveyor including a pair of sprockets mounted at each end of said tank, a pair of sprockets mounted in spaced vertical relation to said first mentioned pairs of sprockets, endless chains supported in triangular form on said three pairs of sprockets, said sprockets being so arranged that said chain is positioned at an angle corresponding to the angle of the adjacent end wall of the tank section and a plurality of cleats connecting said chains.

8. In a device of the class described, a tank including end walls arranged at an angle, a conveyor mounted in said tank, said conveyor including a sprocket mounted at each end of said tank adjacent the top of said tank and a sprocket mounted adjacent the lower end of said tank, said sprockets being arranged in triangular form, an endless sprocket chain supported in triangular form on said three sprockets, said sprockets being so arranged that said chain is positioned at an angle corresponding to the angle of the adjacent end wall of the deep tank section, a plurality of cleats on said chain, said cleats being arranged to remain, at all times, at right angles to the adjacent end wall of said tank, a loading device at one end of said tank, the conveyor sprockets adjacent the loading device being so positioned that said cleats when traveling thereover do not reach their position at right angles to the adjacent end wall until they have entered said tank, said upper conveyor sprocket adjacent the other end of said tank being positioned above said last mentioned conveyor sprockets and being so arranged that said cleats maintain their position at right angles to the adjacent end wall until they have passed out of said tank.

9. In a device of the class described, a tank including two sections, one of said sections being of greater depth than the other of said sections, a removable partition positioned adjacent the juncture of said two tank sections, the top of said partition being spaced from the top of said tank and the bottom of said partition being arranged to allow fluid to pass therebeneath, said deep tank section including end walls arranged at an angle, a framework vertically movable in said deep tank section, a conveyor mounted on said framework, said conveyor including two sets of spaced sprockets mounted adjacent the top of said framework and one set of spaced sprockets mounted adjacent the lower end of said framework, a pair of spaced sprocket chains supported on said three sets of sprockets, said sprockets being so arranged that said chains are positioned at an angle corresponding to the angle of the adjacent end wall of the deep tank section, a plurality of slats connecting said chains, a plurality of cleats connected to said slats, said cleats being arranged to remain, at all times, at right angles to the adjacent end wall of said deep tank section, a loading device positioned adjacent the end of said deep tank section remote from said shallow tank section, said upper conveyor sprockets adjacent the loading device being so positioned that said cleats when traveling thereover do not reach their position at right angles to the adjacent end wall until they have entered said tank, said upper conveyor sprockets adjacent the shallow tank section being positioned above said last mentioned conveyor sprockets and being so arranged that said cleats maintain their position at right angles to the adjacent end wall until they have passed out of said tank, and means to drive said conveyor.

10. In a device of the class described, a tank, a conveyor mechanism positioned in said tank, said conveyor mechanism comprising a pair of spaced endless chains, a plurality of sprockets adapted to support said chains, a plurality of transversely extending slats secured to said spaced chains, a plurality of cleats, said cleats each including a bottom wall, a pair of side walls extending beyond said bottom wall in the direction of the travel of said cleats, the end of said bottom wall adjacent said slats being positioned between adjacent slats and means to hold said cleats in position.

11. In a conveyor mechanism, a pair of spaced endless members, means to support said members, a plurality of transversely extending slats secured to said pair of spaced members, a plurality of cleats, said cleats each including a bottom wall, a pair of side walls extending beyond said bottom wall, in the direction of the travel of said cleats, there being an elongated aperture in each of said side walls adjacent the edge thereof in advance of said bottom wall, a pin positioned in each of said elongated apertures and secured to one of said slats, a pin in each of said side walls adjacent said bottom wall, said last mentioned pins being in pivotal engagement with said side walls and secured to one of said slats.

In testimony whereof, I hereunto affix my signature.

CHARLES B. COOK.